United States Patent [19]

Morell

[11] Patent Number: 4,819,499
[45] Date of Patent: Apr. 11, 1989

[54] RACK AND PINION STEERING GEAR

[75] Inventor: Philip C. Morell, Sterling Heights, Mich.

[73] Assignee: TRW Inc., Lyndhurst, Ohio

[21] Appl. No.: 74,345

[22] Filed: Jul. 16, 1987

[51] Int. Cl.⁴ .............................................. B62D 1/20
[52] U.S. Cl. ........................................ 74/498; 74/30; 280/95.1
[58] Field of Search ............ 74/30, 422, 498, 388 PS; 280/95 R, 96

[56] References Cited

U.S. PATENT DOCUMENTS

| | | | |
|---|---|---|---|
| 1,433,401 | 10/1922 | Moorman | 74/30 |
| 3,157,061 | 11/1964 | Parker | 74/498 |
| 3,605,933 | 9/1971 | Millard | 280/96 |
| 3,834,727 | 9/1974 | Adams | 280/95 R |
| 3,951,045 | 4/1976 | Frei et al. | 74/498 |
| 4,010,925 | 3/1977 | Garchinsky | 248/295.1 |
| 4,028,957 | 6/1977 | Wright | 74/498 |
| 4,479,400 | 10/1984 | Rieger | 74/422 |

*Primary Examiner*—Dirk Wright
*Assistant Examiner*—Scott Anchell
*Attorney, Agent, or Firm*—Tarolli, Sundheim & Covell

[57] ABSTRACT

An end take-off rack and pinion steering gear assembly is converted into a center take-off rack and pinion steering gear assembly by attaching a U-shaped bracket to the opposite ends of the rack bar of the end take-off assembly. Steering linkage is connected to the base leg of the bracket extending parallel to the rack, at a point which is intermediate the ends of the bracket and which corresponds to the linkage attachment point on a center take-off assembly. The bracket length is adjustable to correspond to the length of the rack bar.

14 Claims, 1 Drawing Sheet

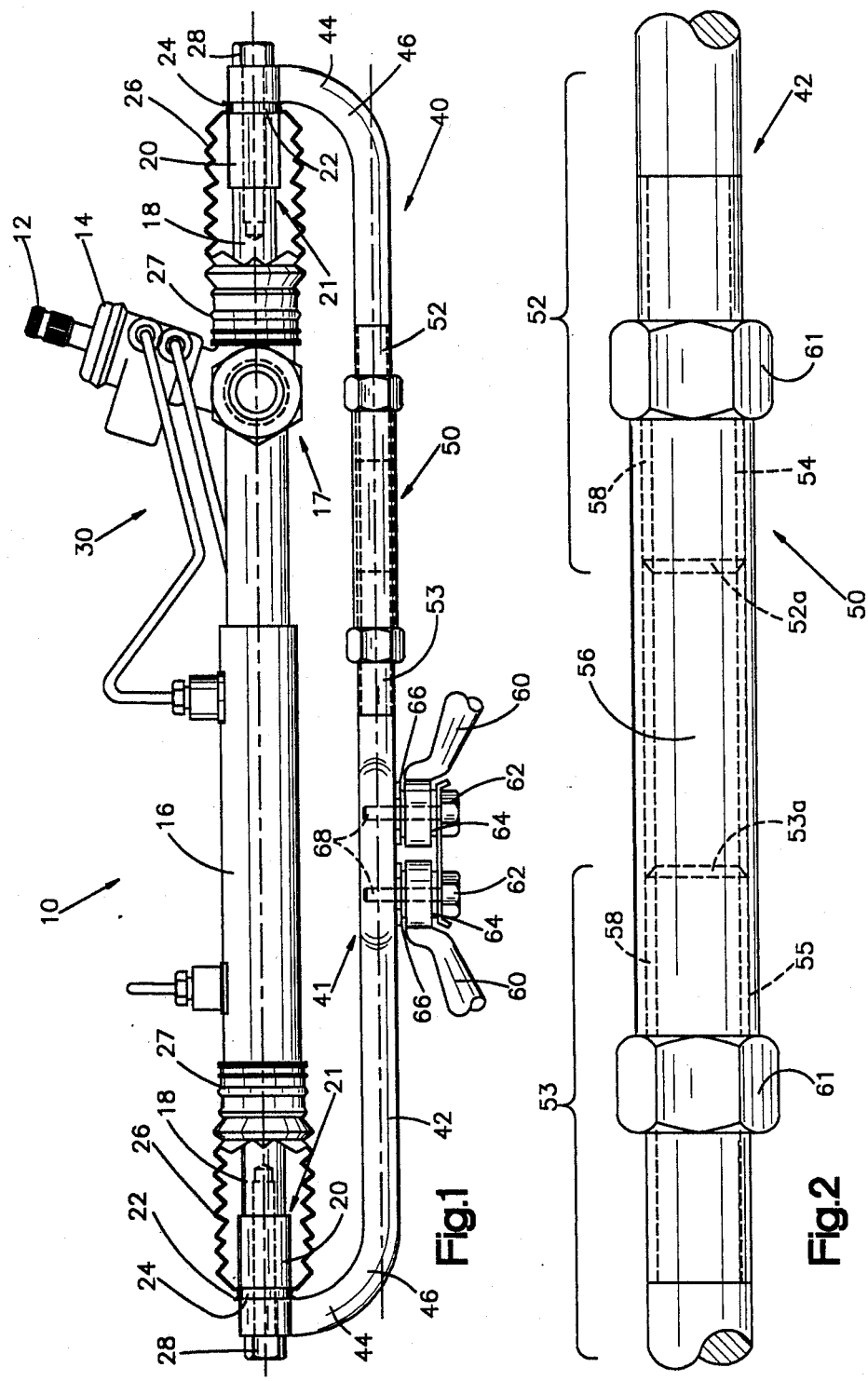

RACK AND PINION STEERING GEAR

BACKGROUND OF THE INVENTION

1. Field of the Invention

This invention relates to a rack and pinion steering gear assembly, and to a method of manufacturing a rack and pinion steering gear assembly.

2. Prior Art

A rack and pinion steering gear assembly is used to turn the steerable wheels of a vehicle and includes a rack mounted for axial movement in a rack housing. A pinion gear drivingly connected with the steering wheel projects into the rack housing. The teeth of the pinion gear engage teeth on the rack. In a non-power assisted rack and pinion steering gear assembly, turning the steering wheel causes the pinion to turn, which directly causes the rack to move. In a hydraulic power assisted rack and pinion steering gear assembly, when the steering wheel is turned a hydraulic valve is actuated and fluid is directed to a hydraulic motor which moves the rack. The pinion is rotated by the rack in a follow-up manner to return the hydraulic valve to neutral as the wheels turn. In the event of a failure in the hydraulics, when the steering wheel is turned, the rack moves axially because of the meshing engagement of the teeth of the rack and pinion.

Rack and pinion steering gear assemblies are of two basic types, "end take-off" and "center take-off". An end take-off assembly has portions of the rack bar protruding from opposite ends of the housing. The steerable wheels of the vehicle are connected, via appropriate linkage, one to each such end portion. Upon turning of the steering wheel, the end portions of the rack bar move, thus causing movement of the steering linkage connected thereto to steer the vehicle A center take-off rack and pinion steering gear assembly has both steerable wheels connected via appropriate linkage to one portion of the rack at a point intermediate the ends of the rack.

Few components of a typical center take-off rack and pinion steering gear assembly are interchangeable with those of a typical end take-off rack and pinion steering gear assembly. Therefore, separate and different tooling and parts inventories are required to manufacture a center take-off rack and pinion steering gear assembly and an end take-off rack and pinion steering gear assembly.

SUMMARY OF THE INVENTION

The present invention provides an apparatus and method for converting an end take-off rack and pinion steering gear assembly into a center take-off rack and pinion steering gear assembly This is accomplished through the use of a U-shaped bracket. The U-shaped bracket is connected to and extends between the end portions of rack of the end take-off rack and pinion steering gear assembly. The bracket has fastening means located intermediate its ends at a point corresponding to the vehicle steering linkage attachment point on a center take-off rack and pinion steering gear assembly Steering linkage designed for connection with a center take-off rack and pinion steering gear assembly is connected to the bracket by fastening means. The bracket also includes means for adjusting its overall length. Thus, the end take-off rack and pinion steering gear assembly is easily converted to a center take-off rack and pinion steering gear assembly. The bracket makes it possible to build only end take-off rack and pinion steering gear and still be able to supply center take-off rack and pinion steering gear as called for by a particular vehicle application.

BRIEF DESCRIPTION OF THE DRAWINGS

Further features and advantages of the present invention will become apparent to those skilled in the art from the following detailed description of the invention with reference to the attached drawings, in which:

FIG. 1 is an elevational view partly in section showing an end take-off rack and pinion steering gear assembly to which is secured a bracket to convert it into a center take-off steering gear assembly in accordance with the present invention; and FIG. 2 is an enlarged fragmentary view showing a length adjusting mechanism included in the bracket of FIG. 1.

DESCRIPTION OF A PREFERRED EMBODIMENT

The present invention relates to converting an end take-off rack and pinion steering gear assembly into a center take-off rack and pinion steering gear assembly. The present invention is applicable to a variety of different rack and pinion steering gear constructions including non-power assisted steering gear, electric power assisted steering gear, and hydraulic power assisted steering gear.

FIG. 1 illustrates an end take-off rack and pinion vehicle steering gear assembly 10. A steering shaft 12 connected to and extending from a vehicle steering wheel (not shown) enters a pinion housing 14 near one end of the gear assembly 10. Pinion housing 14 is attached to an elongated rack housing 16 thereby forming a rack housing assembly 17 which is fixed to the vehicle. Carried within rack housing 16 and movable longitudinally therein is an elongated rack 18. Rack 18 has gear teeth thereon (not shown) which mesh with gear teeth on the pinion (not shown) attached to steering shaft 12.

A pair of stops 20 (FIG. 1) are secured one to each end of the rack 18 for limiting axial movement of rack bar 18. Each wheel stop 20 has a shoulder 21 for engaging a fixed portion of rack housing assembly 17 to limit rack bar movement in the axial direction. Each stop also has a reduced diameter portion 22 which receives a clip 24 for attaching one end of one of a pair of flexible bellows 26 to the rack 18. The other end of each flexible bellows 26 is attached to the rack housing assembly 17 at 27. Each stop 20 is secured to its respective end of the rack bar 18 by a threaded screw 28.

The rack and pinion steering gear assembly 10 may include, by way of example, hydraulic power assist. The steering gear assembly 10 includes a valve, located in housing 14, which is actuated when the steering wheel is turned. The valve ports fluid under pressure to a hydraulic motor through conduits 30. The hydraulic motor when actuated moves the rack 8. The rack 18 drives the pinion in a follow-up manner to return the valve to a neutral condition, as is known.

A U-shaped connecting link or bracket 40 (FIG. 1) is attached to and extends between each end of rack bar 18. The U-shaped bracket 40 includes an elongate base section 42 extending parallel to rack bar 18, and a pair of parallel spaced apart leg sections 44 which are joined to the base section 42 by curved portions 46. Bracket 40 is secured to the stops 20 and to the rack 18 by means of the threaded screws 28 which extend through holes in the ends of leg sections 44 of bracket 40. Thus, bracket 40 straddles and is secured to rack 18, and will move longitudinally along with rack 18.

Bracket 40 also includes means for attaching vehicle steering linkage thereto The vehicle steering linkage attaches to base section 42 of bracket 40 (FIG. 1), at an attachment location 41 intermediate the ends of bracket 40 which corresponds to the linkage attachment location on a center take-off rack and pinion steering gear assembly. Bracket 40 is flattened at attachment location 41 to accept attachment of the steering linkage. A pair of steering links 60 are connected to the base section 42 of bracket 40 by a pair of threaded bolts 62. Each of the bolts 62 extends through a respective metal sleeve (not shown) which is encircled by a rubber grommet 64, through a washer 66, and is threaded into a drilled and tapped opening 68 in bracket 40. Links 60 are thus secured to bracket 40 but are free to pivot relative to bracket 40, about the axes of bolts 62, during longitudinal movement of bracket 40. Thus, since the links 60 are connected to bracket 40 and thereby to rack 18, any movement of rack 18 will cause corresponding movement of the links 60 to steer the vehicle as desired. The described attachment of the links 60 to the bracket 40 is merely illustrative. The attachment may be made in any suitable manner.

The overall length of bracket 40 may be adjusted by means of an adjustor 50. Bracket 40 comprises two bracket segments 52, 53 (FIG. 2) whose respective ends 52a, 53a are oppositely externally threaded at 54, 55. A rotatable adjusting sleeve 56 has two internally threaded portions 58 which are oppositely threaded with respect to each other. Sleeve 56 threadedly receives threaded portions 54, 55 of bracket segments 52, 53. The overall length of bracket 40 can be changed by turning sleeve 56 to move bracket segments 52, 53 toward or away from each other. A pair of jam nuts 61 are threaded on the ends of bracket segments 52 and 53. The jam nuts are threaded into engagement with the opposite end of sleeve 56 and lock sleeve 56 in place to fix the length of bracket 40 at the desired length.

To convert an end take-off rack and pinion steering gear assembly into a center take-off rack and pinion steering gear assembly as shown in FIG. 1, bracket 40 is placed into the position shown in FIG. 1 straddling rack 18 wherein the ends of legs 44 of bracket 40 abut the outer ends of stops 20. Bracket 40 is then attached to the stops 20 and the opposite end portions of the rack bar 18 by means of threaded screws 28. The length of bracket 40 is set using the length adjusting mechanism 50. Steering links 60 are then attached to bracket 40 at point 41 intermediate its ends as described above.

During operation of the rack and pinion steering gear assembly 10, turning movement of the vehicle steering wheel (not shown) causes the rack 18 to move longitudinally. The U-shaped bracket 40, being secured to rack bar 18, is thereby also caused to move axially, the same distance as the rack 18. This movement of bracket 40 causes movement of the attached steering links 60, which results in the desired turning of the steerable vehicle wheels.

From the foregoing description, it can be seen that an end take-off rack and pinion steering gear assembly can be converted into a center take-off rack and pinion steering gear assembly. Thus, a separate inventory of center take-off rack and pinion steering gear parts is unnecessary.

I claim:

1. A rack and pinion steering gear assembly for use in a vehicle having a steering wheel, comprising:
   an elongate rack means movable, longitudinally for effecting vehicle steering, said rack means having opposite end portions;
   means for moving said rack means longitudinally in response to turning movement of the vehicle steering wheel; and
   a bracket connected to said opposite end portions of said rack means and extending therebetween,
   said bracket having connections intermediate its ends for attachment of vehicle steering linkage thereto.

2. An assembly as defined in claim 1, wherein said bracket is U-shaped and has a base and two spaced parallel legs extending from said base, and further comprising first fastener means for securing one of said legs to one end of said rack and second fastener means for securing the other of said legs to the other end of said rack.

3. An assembly as defined in claim 2, further comprising third fastener means for securing said vehicle steering linkage to said base of said bracket.

4. A rack and pinion steering gear assembly for use in a vehicle having a steering wheel, comprising:
   an elongate rack movable longitudinally to effect vehicle steering, said rack having opposite end portions;
   means for moving said rack longitudinally in response to turning movement of the vehicle steering wheel; and
   a bracket connected to said opposite end portions of said rack and extending therebetween;
   said bracket having connections intermediate its ends for attachment of a vehicle steering linkage thereto; and
   said bracket including adjusting means for adjusting the length of said bracket.

5. An assembly as defined in claim 4, wherein said bracket comprises two spaced apart bracket segments each having an externally threaded end disposed adjacent an oppositely externally threaded end of the other bracket segment, said adjusting means including an internally threaded sleeve rotatably threaded onto both bracket segment threaded ends whereby the distance between said spaced apart bracket segments is varied by turning said sleeve to adjust the overall length of said bracket.

6. A rack and pinion steering gear assembly for use in a vehicle having a steering wheel comprising:
   an elongate rack movable longitudinally to effect vehicle steering, said rack having opposite end portions;
   means for moving said rack longitudinally in response to turning movement of the vehicle steering wheel;
   a bracket extending between said opposite end portions of said rack, said bracket being U-shaped and having a base and two spaced parallel legs extending from said base;
   first fastener means for securing one of said legs to one end of said rack;
   second fastener means for securing the other of said legs to the other end of said rack;
   linkage which when moved effects vehicle steering; and
   third fastener means for securing said linkage to said base of said bracket.

7. An assembly as defined in claim 6, further comprising means for adjusting the length of said bracket.

8. A method of converting an end take-off rack and pinion steering gear assembly having a rack with opposite end portions movable to effect steering upon longitudinal movement of the rack, to a center take-off rack and pinion steering gear assembly, comprising the steps of:
attaching a bracket to said opposite end portions of the rack, which bracket extends between the opposite end portions of the rack, and
connecting vehicle steering linkage to the bracket intermediate its ends.

9. A method as defined in claim 8, further comprising the step of adjusting the length of the bracket so that it straddles the rack.

10. Apparatus for converting an end take-off rack and pinion steering gear assembly into a center take-off rack and pinion steering gear assembly, said end take-off rack and pinion steering gear assembly being designed for use in a vehicle having a steering wheel and including an elongate rack movable longitudinally to effect vehicle steering, said rack having opposite end portions, said assembly further including means for moving said rack longitudinally in response to turning movement of the vehicle steering wheel, said apparatus comprising:
bracket means for extending between the attachment to said opposite end portions of the rack, said bracket means comprising a U-shaped bracket having a base and two spaced parallel legs extending from said base, said bracket having connections intermediate its ends for attachment of vehicle steering linkage thereto.

11. Apparatus as defined in claim 10, further comprising first fastener means for securing one of said legs to one end portion of the rack and second fastener means for securing the other of said legs to the other end portion of the rack.

12. Apparatus as defined in claim 10, further comprising means for adjusting the length of said bracket.

13. A rack and pinion steering gear assembly for use in a vehicle having a steering wheel and a steering linkage, said assembly comprising:
an elongate rack movable longitudinally for effecting vehicle steering, said rack having opposite end portions;
means for moving said rack longitudinally in response to turning movement of the vehicle steering wheel; and
means for connecting said rack with the vehicle steering linkage, said connecting means comprising:
a bracket for connection to said opposite end portions of said rack and for extending between said opposite end portions of said rack, and
fastener means for attaching the vehicle steering linkage to said bracket intermediate the ends of said bracket.

14. A rack and pinion steering gear assembly as defined in claim 13, wherein said bracket is U-shaped and has a base and two spaced parallel legs extending from said base, and said assembly further comprises means for securing said two legs to said opposite end portions of said rack, respectively.

* * * * *